(12) United States Patent
Pulford et al.

(10) Patent No.: US 9,421,824 B2
(45) Date of Patent: Aug. 23, 2016

(54) PNEUMATIC TIRE WITH SEALANT LAYER

(71) Applicant: The Goodyear Tire & Rubber Company, Akron, OH (US)

(72) Inventors: Carl Trevor Ross Pulford, Akron, OH (US); Xiaoping Yang, Streetsboro, OH (US); Gary Robert Burg, Massillon, OH (US); Deep Samanta, Copley, OH (US); Francois Philippe Depouhon, Arlon (BE); Laurent Roger Andre Dubos, Niederfeulen (LU); Giorgio Agostini, Colmar-Berg (LU); Johanna Maria Galindo Alvarez, Saulnes (FR)

(73) Assignee: The Goodyear Tire & Rubber Company, Akron, OH (US)

( * ) Notice: Subject to any disclaimer, the term of this patent is extended or adjusted under 35 U.S.C. 154(b) by 318 days.

(21) Appl. No.: 14/264,106

(22) Filed: Apr. 29, 2014

(65) Prior Publication Data
US 2015/0306914 A1 Oct. 29, 2015

(51) Int. Cl.
*B60C 19/00* (2006.01)
*B60C 19/12* (2006.01)
*B60C 5/14* (2006.01)
*B29C 73/22* (2006.01)
*B29D 30/06* (2006.01)
*B60C 1/00* (2006.01)

(52) U.S. Cl.
CPC . *B60C 5/14* (2013.01); *B29C 73/22* (2013.01); *B29D 30/0685* (2013.01); *B60C 1/0008* (2013.04); *B60C 19/12* (2013.01); *B60C 19/122* (2013.04); *B29D 2030/0682* (2013.01); *B29D 2030/0689* (2013.01); *B60C 2005/145* (2013.04)

(58) Field of Classification Search
CPC ........ B60C 1/008; B60C 19/12; C60C 19/122
See application file for complete search history.

(56) References Cited

U.S. PATENT DOCUMENTS

| 1,239,291 | A | 9/1917 | Morse et al. |
| 2,877,819 | A | 3/1959 | Gibbs et al. |
| 3,048,509 | A | 8/1962 | Sweet et al. |
| 3,563,294 | A | 2/1971 | Chien |
| 4,140,167 | A | 2/1979 | Bohm et al. |
| 4,171,237 | A | 10/1979 | Bohm et al. |
| 4,206,796 | A | 6/1980 | Chemizard |

(Continued)

FOREIGN PATENT DOCUMENTS

| EP | 264506 | * | 5/1990 |
| GB | 2026959 | A | 2/1980 |
| JP | 2002362119 | A | 12/2002 |

OTHER PUBLICATIONS

European Search Report for Application Serial No. EP15165280 Sep. 1, 2015.

*Primary Examiner* — Justin Fischer
(74) *Attorney, Agent, or Firm* — Robert N. Lipcsik

(57) ABSTRACT

A pneumatic tire includes a reinforcing ply structure extending between a pair of bead portions, a pair of sidewalls, each sidewall located radially outward of one of the pair of bead portions, a tread radially outward from the reinforcing ply structure, a belt reinforcing structure located radially outward from the reinforcing ply structure and radially inward from the tread, and an innerliner structure extending along an inner surface of the reinforcing ply from a position adjacent one bead portion to a position adjacent the other bead portion. The innerliner structure includes multiple alternating layers of rubber compound and sealant.

2 Claims, 3 Drawing Sheets

(56) References Cited

U.S. PATENT DOCUMENTS

| | | |
|---|---|---|
| 4,228,839 A | 10/1980 | Bohm et al. |
| 4,286,643 A | 9/1981 | Chemizard et al. |
| 4,359,078 A | 11/1982 | Egan |
| 4,895,610 A | 1/1990 | Egan |
| 4,919,183 A | 4/1990 | Dobson |
| 4,966,213 A | 10/1990 | Kawaguchi et al. |
| 8,156,979 B2 | 4/2012 | Incavo et al. |
| 8,293,049 B2 | 10/2012 | Incavo |
| 8,646,500 B2 | 2/2014 | Custodero et al. |
| 2003/0230376 A1 | 12/2003 | Smith, Sr. et al. |
| 2004/0149366 A1 * | 8/2004 | Makino ............... B29C 73/20 152/505 |
| 2004/0159386 A1 | 8/2004 | Deevers et al. |
| 2005/0205186 A1 | 9/2005 | Wall et al. |
| 2008/0115872 A1 | 5/2008 | Sandstrom et al. |
| 2009/0126842 A1 | 5/2009 | Incavo et al. |
| 2009/0272485 A1 | 11/2009 | Hata |
| 2011/0030868 A1 | 2/2011 | Hamanaka |
| 2012/0118464 A1 * | 5/2012 | Ruegg, Jr. .......... B29D 30/0685 152/505 |

\* cited by examiner

PNEUMATIC TIRE WITH SEALANT LAYER

FIELD OF THE INVENTION

The present invention relates to a pneumatic tire containing a built-in puncture sealant layer. The puncture sealant layer may be comprised of, for example, organoperoxide depolymerized butyl rubber joined together to form a unitary sealant layer.

BACKGROUND OF THE INVENTION

Conventional pneumatic tires may contain a built-in sealant layer based upon a depolymerized butyl rubber layer. For example, see U.S. Pat. Nos. 4,895,610, 4,228,839, 4,171,237, 4,140,167, 8,156,979, and 8,293,049 and U.S. Patent Publication Nos. 2003/0230376, 2004/0159386, 2005/0205186, and 2008/0115872. Additional patent publications which propose various tire constructions which may involve built-in or built-on sealants for tires, such as for example, U.S. Pat. Nos. 1,239,291, 2,877,819, 3,048,509, 3,563,294, 4,206,796, 4,286,643, 4,359,078, 4,895,610, 4,919,183 and 4,966,213. As a conventional tire rotates, centrifugal force may promote a small degree of flow of the built-in sealant layer located in the shoulder or sidewall regions of the tire toward the center, or crown region, of the tire, thereby reducing the puncture sealing capability of the built-in sealant layer in the shoulder region of the tire. Also, after a tire has stopped rotating the warm, low viscosity sealant flows under gravity to the lowest point in the tire, thereby inducing an imbalance into the tire which is detrimental to tire ride and comfort.

A conventional tire may have a unitary built-in sealant layer divided into zones, namely, an annular central zone positioned in the crown region of the tire and annular lateral zones, wherein the built-in sealant of the lateral zones may be a higher storage modulus (G') material than the sealant of the central zone to present a greater dimensional stability and resistance to flow of the sealant in the lateral zones promoted by centrifugal force resulting by rotation of the tire. The lateral zones of the sealant layer may be individually positioned on each axial side of the central zone. The lateral zones of the sealant layer may be individually positioned axially outward from the center of the sealant layer wherein a central zone extends over the entire axial width of the sealant layer. The storage modulus (G'), at a 5 percent dynamic strain at 100° C. and 1 hertz of the sealant composition of the lateral sealant zones to be least 15, alternately, at least 20.0 kPa higher (greater) than the sealant composition of the central sealant zone.

The zones of the built-in sealant layer of pneumatic tires may be derived from a depolymerization of a butyl rubber-based sealant precursor composition, typically containing a rubber reinforcing carbon black filler to render the sealant black in color or containing precipitated silica with only a minimal amount of carbon black, if any, or exclusive of carbon black, together with a colorant to color the sealant layer a color other than black. For such a zoned sealant layer, amount of organoperoxide efficiency for the in situ depolymerization of the butyl rubber may be instructive.

By controlling the amount of the organoperoxide, free radical promoted butyl rubber depolymerization activity, or rate, (referred to herein as organoperoxide activity) may be varied and the degree (extent) of depolymerization of the butyl rubber varied, depending upon the selection of organoperoxide for the individual sealant zones to thereby result in the sealant compositions of the individual sealant zones having different storage modulus (G') values. Accordingly, an organoperoxide for a sealant precursor of the central zone may have a greater activity (a more active organoperoxide) than the organoperoxide of the lateral zones.

For example, where the organoperoxide for the lateral zones is comprised of dicumyl peroxide for the in situ formation of the built-in sealant of the lateral zones, a more active organoperoxide (such as for example n-butyl-4,4-di(tert-butyl-peroxy) valerate) may be used for the aforesaid central zone. Therefore, by using organoperoxides of differing activities at about the same temperature, the in situ formation of the built-in sealant of the lateral zones may have a greater storage modulus (G') than the storage modulus (G') of the central zone, and, accordingly, a reduced tendency for flow under conditions of centrifugal force occasioned by rotation of the tire.

A treatment of precipitated silica with, for example, at least one of polyalkylene glycol (e.g. polyethylene glycol) and alkoxysilane may inhibit, retard, and/or significantly prevent contact of hydroxyl groups contained on the precipitated (synthetic amorphous) silica aggregates with the organoperoxide, as well as possibly water moieties thereon. Accordingly, precipitated silica may be treated in situ within the rubber composition prior to addition of the organoperoxide, or may be pre-treated prior to its addition to the rubber composition, with a low molecular weight polyalkylene oxide polymer, which may be referred to as a polyalkylene glycol (e.g. polyethylene glycol) and/or with an alkoxysilane. It has been considered that significant challenges may be presented using the precipitated silica (optionally, also including the clay when used in combination with the precipitated silica), particularly when used in place of rubber reinforcing carbon black for reinforcing filler for a non-black colored sealant. Therefore, when the precipitated silica is used, it may be treated with one or both of a polyalkylene oxide (e.g. polyethylene oxide) and alkoxysilane.

While the butyl rubber, as a copolymer of isobutylene and isoprene, may be composed of greater than one weight percent units derived from isoprene, it may further be composed of from about 0.5 to 1.0 weight percent units derived from isoprene. The use of a butyl rubber with such low unsaturation content may promote a more efficient depolymerization by treatment with the organoperoxide where the presence of the double bonds within the butyl rubber may tend to terminate its depolymerization when the depolymerization process reaches the double bond unsaturation in the butyl rubber.

To promote better processing of the butyl rubber-based sealant precursor composition, a butyl rubber may have a relatively high Mooney viscosity (ML+8) value at 125° C. in a range from about 25 to about 60, alternately, from about 40 to about 60. Thus, a butyl rubber of very low isoprene-based unsaturation content (for more effective depolymerization of the butyl rubber) and relatively high Mooney viscosity (to promote better physical handling of the sealant precursor composition) may be used.

The butyl rubber-based sealant precursor composition may have a storage modulus (G') physical property, at a 5 percent dynamic strain at 100° C. and 1 hertz in a range from about 170 to about 350 kPa, alternately, in a range of from about 175 to about 300 kPa. The term "phr" may designate parts by weight of an ingredient per 100 parts of elastomer, unless otherwise indicated. The terms "elastomer" and "rubber" may be interchangeable unless otherwise indicated. The terms "cure" and "vulcanize" may be interchangeable unless otherwise indicated.

SUMMARY AND PRACTICE OF THE PRESENT INVENTION

A pneumatic tire in accordance with the present invention includes a reinforcing ply structure extending between a pair of bead portions, a pair of sidewalls, each sidewall located radially outward of one of the pair of bead portions, a tread radially outward from the reinforcing ply structure, a belt reinforcing structure located radially outward from the reinforcing ply structure and radially inward from the tread, and an innerliner structure extending along an inner surface of the reinforcing ply from a position adjacent one bead portion to a position adjacent the other bead portion. The innerliner structure includes multiple alternating layers of rubber compound and sealant. In this way, the low viscosity sealant may be divided into multiple, thinner channels as opposed to one thick channel. The thinner channels may reduce flow of the sealant under centrifugal or gravitational forces.

According to another aspect of the pneumatic tire, the rubber compound and sealant layers each have a single uniform thickness.

According to still another aspect of the pneumatic tire, the rubber compound layers have a first thickness and the sealant layers have a second thickness different than the first thickness.

According to yet another aspect of the pneumatic tire, the rubber compound layers and the sealant layers have graduated thicknesses that decrease as the layers move radially away from the tread.

According to still another aspect of the pneumatic tire, the rubber compound layers and the sealant layers have graduated thicknesses that increase as the layers move radially away from the tread.

According to yet another aspect of the pneumatic tire, the innerliner comprises between two and five layers of rubber compound and sealant.

According to still another aspect of the pneumatic tire, the innerliner comprises between two and five layers of rubber compound and sealant.

According to yet another aspect of the pneumatic tire, the innerliner comprises between five and ten layers of rubber compound and sealant.

According to still another aspect of the pneumatic tire, the innerliner comprises between ten and twenty layers of rubber compound and sealant.

According to yet another aspect of the pneumatic tire, the innerliner comprises between twenty and thirty layers of rubber compound and sealant.

According to still another aspect of the pneumatic tire, the innerliner comprises between thirty and forty layers of rubber compound and sealant.

According to yet another aspect of the pneumatic tire, the innerliner comprises between forty and fifty layers of rubber compound and sealant.

According to still another aspect of the pneumatic tire, the innerliner comprises between two and fifty layers of rubber compound and sealant.

According to yet another aspect of the pneumatic tire, the innerliner comprises between two and twenty-five layers of rubber compound and sealant.

According to still another aspect of the pneumatic tire, the innerliner comprises between twenty-five and fifty layers of rubber compound and sealant.

According to yet another aspect of the pneumatic tire, the innerliner comprises between five and fifteen layers of rubber compound and sealant.

According to still another aspect of the pneumatic tire, the innerliner comprises an odd number of layers of rubber compound and sealant and the innerliner has one more layer of rubber compound than sealant.

According to yet another aspect of the pneumatic tire, the innerliner comprises an odd number of layers of rubber compound and sealant and the innerliner has one more layer of sealant than rubber compound.

BRIEF DESCRIPTION OF THE DRAWINGS

For a further understanding of the present invention, drawings are provided in the form of FIGS. 1 through 6.

DESCRIPTION OF EXAMPLES OF THE PRESENT INVENTION

Figure 1:
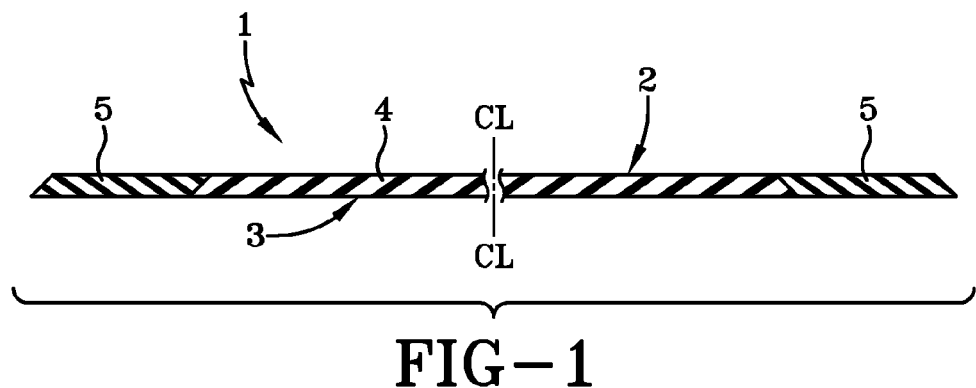
FIG. 1 schematically represents a cross-section of a zoned sealant layer.

In FIG. 1 and as disclosed by U.S. Pat. No. 8,156,979 to Incavo et al., herein incorporated entirely by reference, a zoned sealant precursor strip 1 may be provided in a form of a butyl rubber based strip 1 divided into a central zone 4 and lateral outboard zones 5 with the centerline of the sealant precursor strip 1 being designated as CL. The sealant precursor strip have a top side 2 and a bottom side 3. The sealant composition of the central zone 4 may contain butyl rubber and an organoperoxide comprised of n-butyl-4,4-di(tert-butyl-peroxy) valerate and the sealant composition of lateral zones 5 may contain butyl rubber and a less active organoperoxide comprised of dicumyl peroxide.

Figure 2:
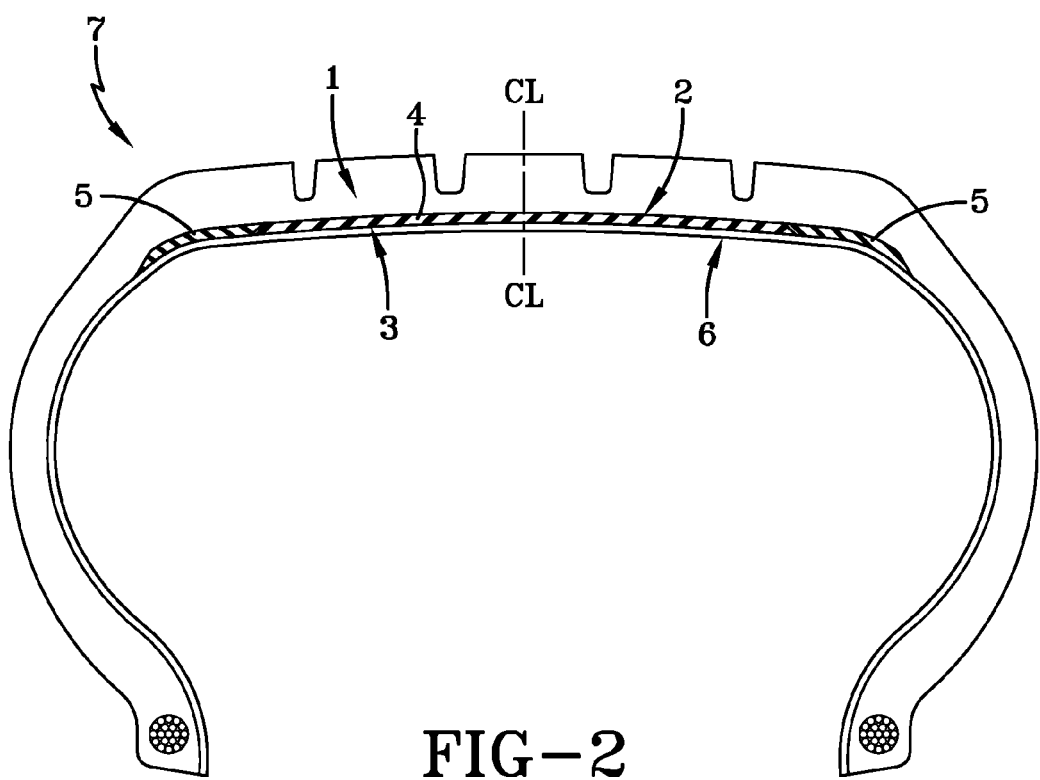
FIG. 2 schematically represents a cross-section of a pneumatic tire with the zoned sealant layer of FIG. 1.

The zoned sealant precursor strip 1 may be built into an assembly of rubber tire components and the assembly may be cured in a suitable mold at an elevated temperature to form a tire 7 as depicted in FIG. 2 having a built-in sealant layer 1 with the central zone 4 in the crown region of the tire and lateral outboard zones 5 in the shoulder region of the tire 7 created by in situ organoperoxide depolymerization of the butyl rubber in respective zones of the sealant precursor strip 1.

Figure 3:
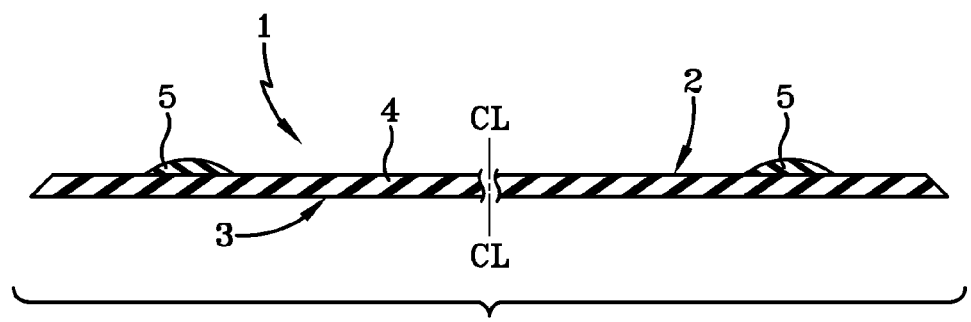
FIG. 3 schematically represents a cross-section of another zoned sealant layer.

In FIG. 3, the zoned sealant precursor strip 1 may be provided in a form of a butyl rubber based strip 1 divided into a central zone 4 which extends throughout the width of the sealant precursor strip 1 and lateral zones 5 which are positioned on the top surface 2 of the central zone 4 and spaced apart from the centerline CL of the sealant precursor strip 1 and its peripheral edges. The central zone 4 may contain butyl rubber and an organoperoxide comprised of n-butyl-4,4-di (tert-butyl-peroxy) valerate and the lateral zones 5 may contain butyl rubber and a less active organoperoxide comprised of dicumyl peroxide.

Figure 4:
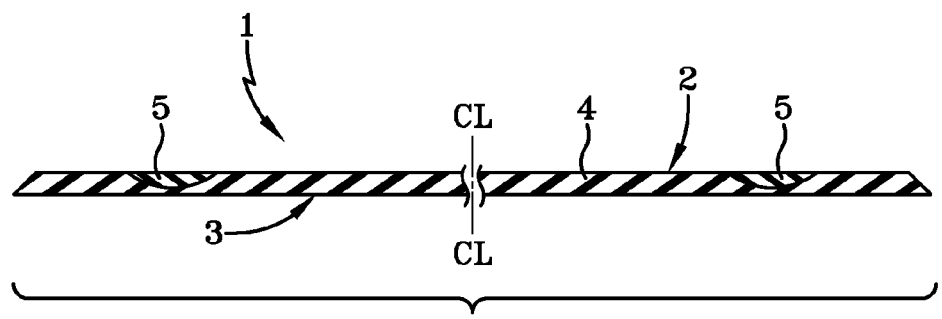
FIG. 4 schematically represents a cross-section of still another zoned sealant layer.
Figure 5:
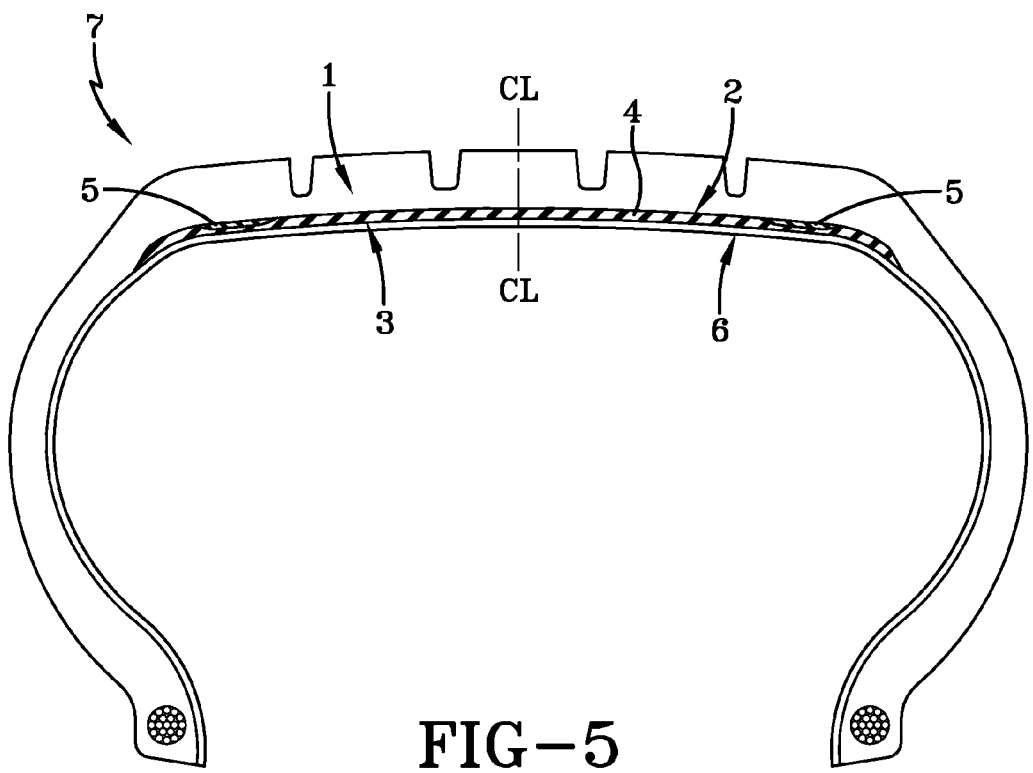
FIG. 5 schematically represents a cross-section of a pneumatic tire with the zoned sealant layer of FIG. 4.

FIG. 4 is similar to FIG. 3 except that, in FIG. 4, the sealant precursor for the lateral zones 5 may be applied to depressions in the central zone 4. The zoned sealant precursor strip 1 may be built into an assembly of rubber tire components and the assembly may be cured in a suitable mold at an elevated temperature to form a tire 7 as depicted in FIG. 5 having a built-in sealant layer 1 with the central zone 4 in the crown region of the tire and lateral zones 5 in the shoulder region of the tire 7 created by in situ organoperoxide depolymerization of the butyl rubber in respective zones of the sealant precursor strip 1.

The following examples are provided to aid in understanding the present invention. The examples do not limit the scope of the present invention or the manner in which the present invention may be practiced. A butyl-rubber-based sealant may serve a dual purpose of both air barrier and sealant, but the reduction of unwanted flow by containing the sealant in thin channels would be effective with other suitable low-viscosity sealant material. For the butyl-rubber-based sealant precursor example, parts and percentages are given by weight unless otherwise indicated.

EXAMPLE I

Illustrative butyl rubber-based sealant precursor compositions are prepared by mixing ingredients in an internal mixer. The ingredients are mixed in a first, non-productive, mixing stage without the organoperoxide followed by a second, productive, mixing stage in which dicumyl peroxide is added subsequent to addition of a precipitated silica. The ingredients are illustrated in the following Table 1.

Rubber Sample A represents a sealant precursor rubber composition using a more active organoperoxide "A".

Samples B and C represent a sealant precursor rubber composition using a less active organoperoxide "B", namely a dicumyl peroxide.

For Sample B, less active organoperoxide "B" is used.

For Sample C, the less active organoperoxide "B" is used in combination with a magnesium oxide modifier.

For Sample D, the less active organoperoxide "B" is used in combination with a calcium carbonate co-modifier.

The parts and percentages are by weight unless otherwise indicated.

From Table 1, it can be seen that the average storage modulus G' for the lateral sealant zone for Sample B (59 kPa) and Sample C (43 kPa) which used the less active organoperoxide "B", namely the dicumyl peroxide composite, was significantly higher (by at least 20 kPa) than the storage modulus G' for the central sealant zone Sample A (20 kPa) which used the more active organoperoxide "A", thereby presenting a greater resistance to flow for the sealant composition of the lateral sealant zone.

The aforesaid storage modulus G' physical properties for the sealant compositions are determined at a 5 percent dynamic strain at 1 hertz at 100° C. by an aforesaid RPA (Rubber Process Analyzer) instrument. The measurement is made prior to, and after, a 30 minute heat at 150° C. to yield a delta G' (at a 5 percent dynamic strain) for the depolymerization reaction. The Rubber Process Analyzer instrument used was RPA 2000™ instrument by Alpha Technologies.

EXAMPLE II

A tubeless pneumatic steel belted medium radial truck tire is prepared by first applying a standard butyl rubber innerliner layer (e.g. bromobutyl rubber composition) to a standard building drum. Then a zoned layer of butyl rubber-based sealant precursor similar to FIG. 1 composed of lateral zones comprised of the composition of Sample B of Example I and a central zone comprised of the composition of Sample A of Example I having a thickness of about 0.76 cm (about 0.3 inches) is applied to the innerliner layer on the building drum followed by application of diene rubber based carcass components, including the carcass plies, tread, sidewalls and

TABLE 1

| Material | Central Lateral Sealant Zone Sample A | Alternate Lateral Sealant Zone Sample B | Sealant Zone Sample C |
|---|---|---|---|
| First (Non-Productive) Mixing Step | | | |
| Butyl rubber[1] | 100 | 100 | 100 |
| Precipitated, amorphous silica[2] | 20 | 20 | 20 |
| Clay[3] | 10 | 10 | 10 |
| Polyethylene glycol[4] | 0.25 | 0.25 | 0.25 |
| Rubber processing oil[5] | 3 | 3 | 3 |
| Colorant as a yellow colored pigment masterbatch[6] | 1 | 1 | 1 |
| Second (Productive) Mixing Step | | | |
| More active organoperoxide "A"[7] | 12 | 0 | 0 |
| Less active organoperoxide "B"[8] | 0 | 12 | 15 |
| Average storage modulus G' 5%, kPa[9] | 20 | 59 | 43 |

[1]Butyl rubber as Butyl 068 ™ from the ExxonMobil Company, having a Mooney (1 + 8) viscosity at 125° C. of about 51, as a copolymer of isobutylene and isoprene having less than one percent units derived from isoprene
[2]Amorphous precipitated silica as Hubersil 4155 from J. M. Huber Company
[3]Kaolin clay as RC-32 ™ from Thiele Kaolin Company
[4]Polyethylene glycol having a weight average molecular weight of about 8,000 (understood to be about plus or minus about 1,000) as Carbowax PEG 8000 ™ from the Dow Chemical Company
[5]Rubber processing oil as Tufflo 100 ™ from Barton Solvents Company reportedly a naphthenic, paraffinic rubber processing oil having a maximum aromatic content of less than 15 weight percent
[6]A yellow colored organic/inorganic pigment as Akrosperse E-6837 ™ yellow EPMB pigment masterbatch with EPR (ethylene/propylene rubber), in a 50/50 weight ratio of yellow pigment to EPR, from the Akrochem Company and reported in Table 1 as the composite.
[7]Organoperoxide "A" as a composite of organoperoxide as a combination of n-butyl-4,4-di(tert-butyl-peroxy) valerate and a mineral carrier as a combination of calcium carbonate and calcium silicate containing about 40 weight percent of the organoperoxide (thus reported herein as being 40 percent active) as Link Cup NBV 40C ™ from the Geo Specialty Chemical Company and reported in Table 1 as the composite.
[8]Organoperoxide "B" as a composite of organoperoxide as a combination of dicumyl peroxide and a mineral carrier as a combination of calcium carbonate and calcium silicate containing about 40 weight percent of the dicumyl peroxide (thus reported herein as being 40 percent active) as Luperox DCP40P ™ from the Arkema Company and reported in Table 1 as the composite.
[9]The storage modulus G' for the sealant composition after organoperoxide depolymerization of the butyl rubber in the sealant precursor composition in terms of their G' at a 5 percent dynamic strain at 100° C. and 1 Hertz.

The Samples were heated to a temperature of about 150° C. for about 30 minutes to at last partially depolymerize the butyl rubber in the presence of the organoperoxide.

beads, to form the uncured, or green, tire construction, or assembly, which contains the zoned butyl rubber-based sealant precursor layer.

The green tire is cured in a suitable tire curing mold at an elevated temperature to form a tire with a built-in sealant layer similar to FIG. 2 having a thickness of about 0.38 cm (about 0.15 inches) formed by a partial (substantial) depolymerization of the zoned butyl rubber-based sealant precursor layer by the respective organoperoxides an elevated tire cure temperature with the sealant composition of the lateral zones having a storage modulus (G') at least 20 kPa greater than the sealant composition of the central zone and thereby presenting a greater dimensional stability and resistance to flow for the lateral zones.

It is desirable to stop flow of the built-in sealant layer under gravity, when the tire is not rotating (e.g., creates imbalance) and also provide puncture protection over the whole outside surface of the tire (e.g., not just the crown). In accordance with the present invention, an improved sealant layer may have an internal structure of multiple (e.g., 50) alternating microlayers of standard, inexpensive rubber compound and the built-in sealant layer described above. The improved sealant layer may be applied across the entire inner surface of a green carcass, similar to a conventional butyl innerliner or in place of the butyl innerliner. The improved sealant layer may thus serve as an air barrier and also seal punctures. In accordance with the present invention, a thick, heavy layer, which may flow under gravity, may be replaced with multiple thinner, lighter layers, which may be supported and/or constrained by the adjacent rubber compound layers. Thus, the improved sealant layer may substantially resist "sagging under gravity." Thus, a sheet with an internal structure of, for example, 50 alternating microlayers of regular black compound and a sealant gum, may be applied over the entire inside surface of a green carcass, similar to an innerliner component. The sheet may thereby serve as an air barrier until a puncture occurs.

Figure 6:
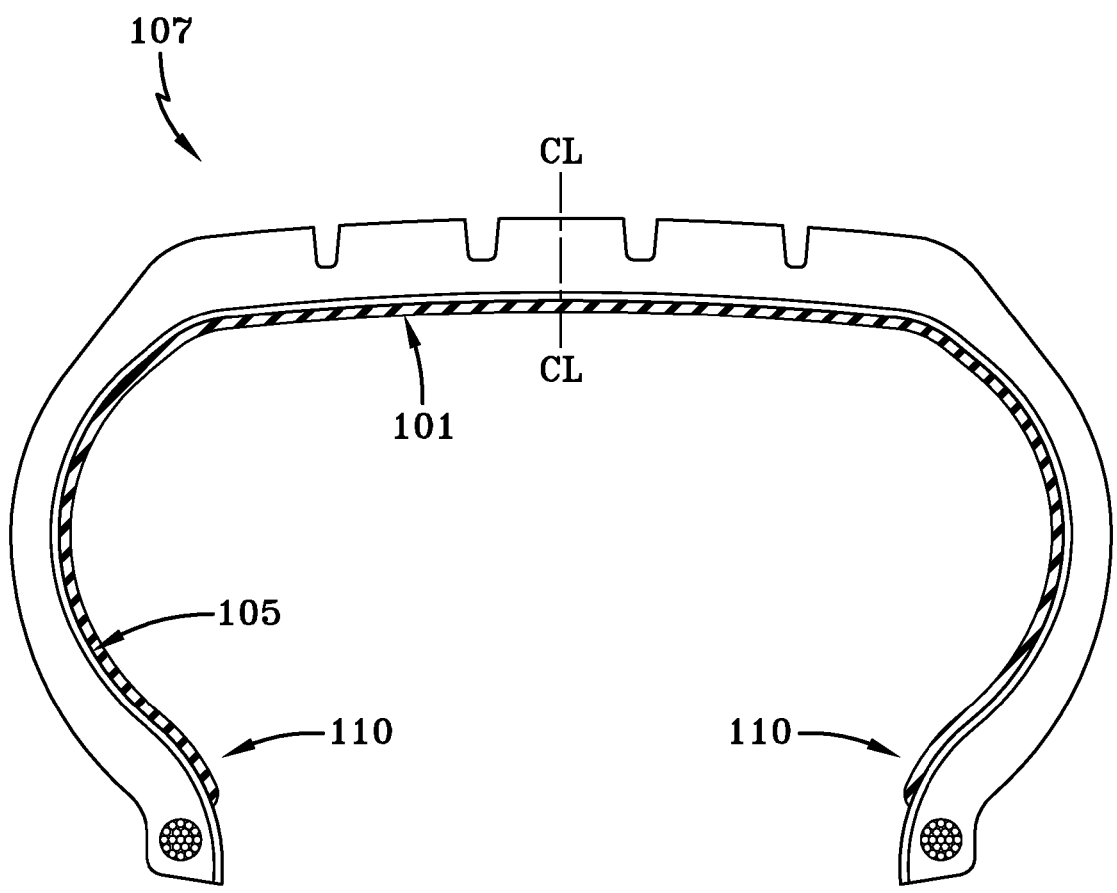
FIG. 6 schematically represents a cross-section of a pneumatic tire with a sealant layer in accordance with the present invention.

In FIG. 6, a sheet layer 101 in accordance with the present invention may be provided on an inner surface 106 of a pneumatic tire 107. The sheet layer 101 may extend from bead area 110 to bead area 110 along an inner surface of the carcass ply 105. The sheet layer 101 may have an internal structure of multiple (e.g., 2-5, 5-10, 10-20, 20-30, 30-40, 40-50, 2-50, 2-25, 25-50, 5-15, etc.) alternating microlayers of standard, inexpensive rubber compound and the built-in sealant layer described above. The thicknesses of the rubber compound and built-in sealant layers may be uniform, or the rubber compound layer(s) may have a first thickness and the sealant layer(s) may have a different second thickness, or either the rubber compound layer(s) or sealant layer(s), or both, may have thicker layers nearer to, or farther from, the tread and graduated lesser, or greater, thicknesses as the layers move farther from, or nearer to, the tread.

The sheet layer 101 may have an odd number of layers of rubber compound and sealant and may have one more layer of rubber compound than sealant (e.g., rubber compound outer surfaces) or one more layer of sealant than rubber compound (e.g., sealant outer surfaces). An even number of layers will result in one side of the sheet layer 101 being rubber compound and the other side being sealant. The sheet layer 101 may be joined to the reinforcing ply 105 at either the rubber compound side or the sealant side.

While certain representative examples and details have been shown for the purpose of illustrating the present invention, it will be apparent to those skilled in this art that various changes and modifications may be made therein without departing from the spirit or scope of the present invention.

What is claimed:

1. A pneumatic tire comprising:
    a reinforcing ply structure extending between a pair of annular bead portions;
    a pair of sidewalls, each sidewall located radially outward of one of the pair of bead portions;
    a tread radially outward from the reinforcing ply structure;
    a belt reinforcing structure located radially outward from the reinforcing ply structure and radially inward from the tread; and
    an innerliner structure extending along an inner surface of the reinforcing ply from a position adjacent one bead portion to a position adjacent the other bead portion, the innerliner structure comprising between ten and twenty layers alternating layers of rubber compound and sealant,
    the rubber compound layers and the sealant layers having graduated thicknesses that decrease as the layers move radially away from the tread.

2. A pneumatic tire comprising:
    a reinforcing ply structure extending between a pair of annular bead portions;
    a pair of sidewalls, each sidewall located radially outward of one of the pair of bead portions;
    a tread radially outward from the reinforcing ply structure;
    a belt reinforcing structure located radially outward from the reinforcing ply structure and radially inward from the tread; and
    an innerliner structure extending along an inner surface of the reinforcing ply from a position adjacent one bead portion to a position adjacent the other bead portion, the innerliner structure comprising between ten and twenty layers alternating layers of rubber compound and sealant,
    the rubber compound layers and the sealant layers having graduated thicknesses that increase as the layers move radially away from the tread.

* * * * *